United States Patent [19]

Roll

[11] 4,096,217
[45] Jun. 20, 1978

[54] METHOD OF USING A PARTICULAR TRISTIMULUS COLORIMETER IN MAKING ARTIFICIAL TEETH

[75] Inventor: Kenneth A. Roll, Canton, Ohio

[73] Assignee: Sterndent Corporation, Old Greenwich, Conn.

[21] Appl. No.: 678,922

[22] Filed: Apr. 21, 1976

Related U.S. Application Data

[62] Division of Ser. No. 499,479, Aug. 22, 1974, Pat. No. 3,986,777.

[51] Int. Cl.² .......................... B29C 11/00; B29F 5/00
[52] U.S. Cl. ..................................... 264/20; 264/40.1; 264/60; 264/245; 264/250; 264/259; 356/176
[58] Field of Search ....................... 264/16, 19, 20, 60, 264/245, 250, 40.1; 356/175-177

[56] References Cited

U.S. PATENT DOCUMENTS

| | | | |
|---|---|---|---|
| 1,547,643 | 7/1925 | Clapp | 264/60 |
| 2,314,957 | 3/1943 | Thornton et al. | 264/60 |
| 2,869,415 | 1/1959 | Kaye | 356/177 |
| 3,159,742 | 12/1964 | Davidson | 356/176 |
| 3,600,092 | 8/1971 | Murata | 356/176 |
| 3,707,726 | 12/1972 | Stearns | 356/176 |
| 3,802,783 | 4/1974 | Simmonds | 356/195 |
| 3,885,878 | 5/1975 | Ishak | 356/176 |

OTHER PUBLICATIONS

Tylman, "Theory & Practice of Crown and Bridge Prosthesis" Mosby, St. Louis, (1947) pp. 270-277, 279-281 and 532 & 533 relied on.
Ishak, Fibre Optics Colorimeter, Optica ACTA, vol. 17 (1970), pp. 725-732.

Primary Examiner—Willard E. Hoag
Attorney, Agent, or Firm—Maky, Renner, Otto & Boisselle

[57] ABSTRACT

Method of using a tristimulus colorimeter including a modified dual slope integrator digital voltmeter which measures the red, blue and green light reflected from a sample and displays the same in digital form as optical density units. The colorimeter includes a light conducting probe with a diffusing member and a movable collar for blocking ambient light, and a rotating color filter wheel is synchronized with the voltmeter for effecting a continuous update of the data displayed thereby. Moreover, a color averaging method provides for prediction of the ultimate color of a mixture of two differently colored porcelains or the like especially used in the construction of artificial teeth or the like.

12 Claims, 6 Drawing Figures

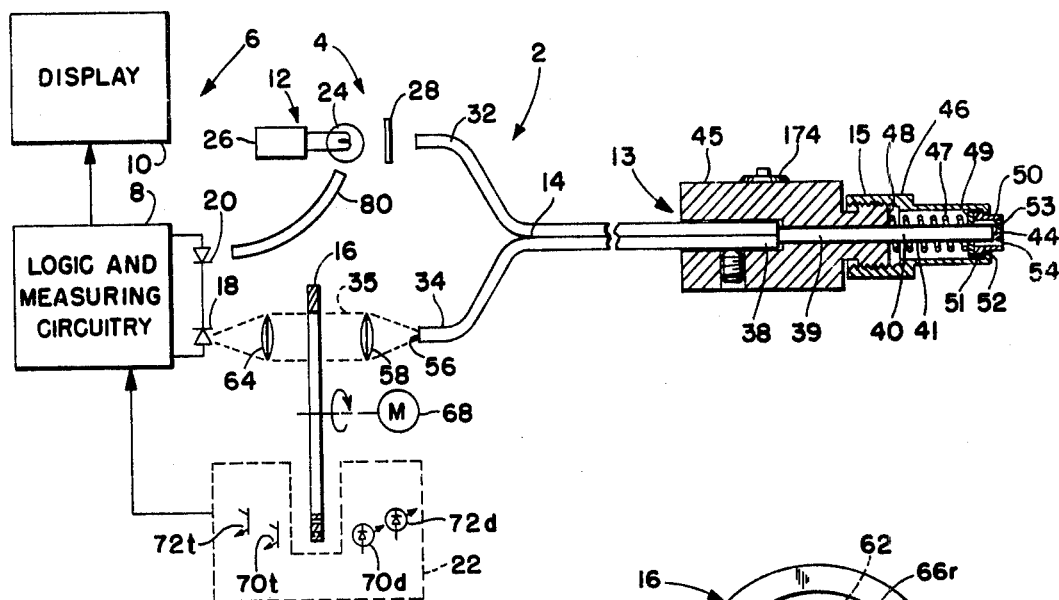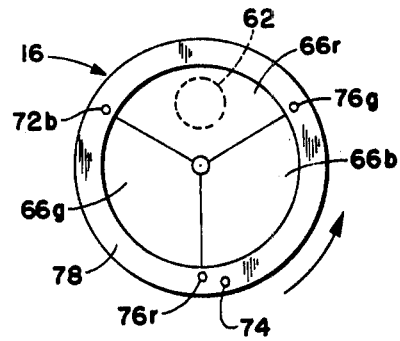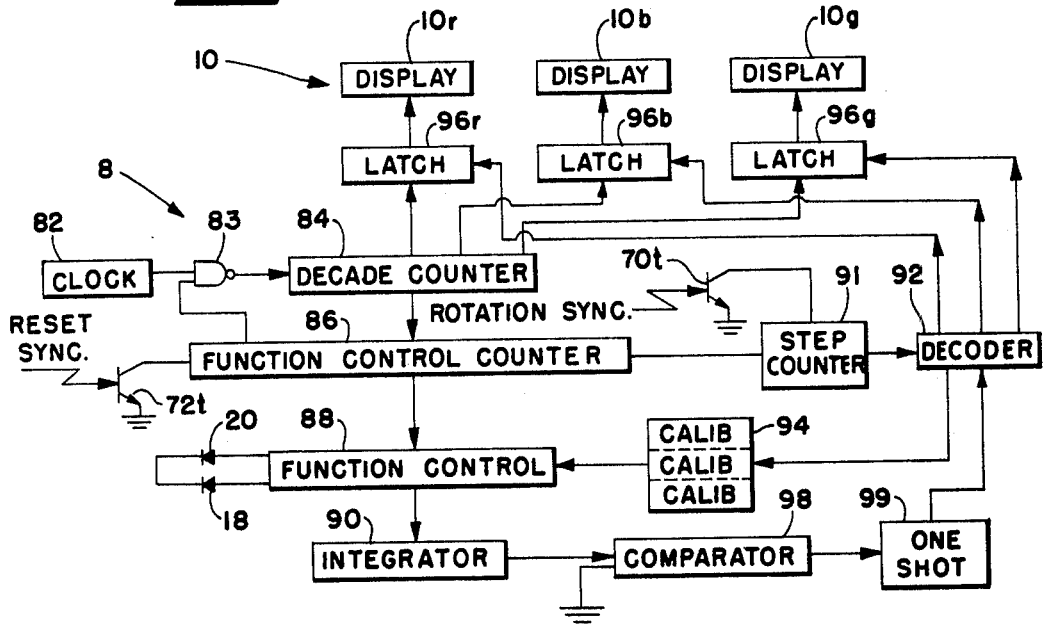
Fig. 1
Fig. 2
Fig. 3

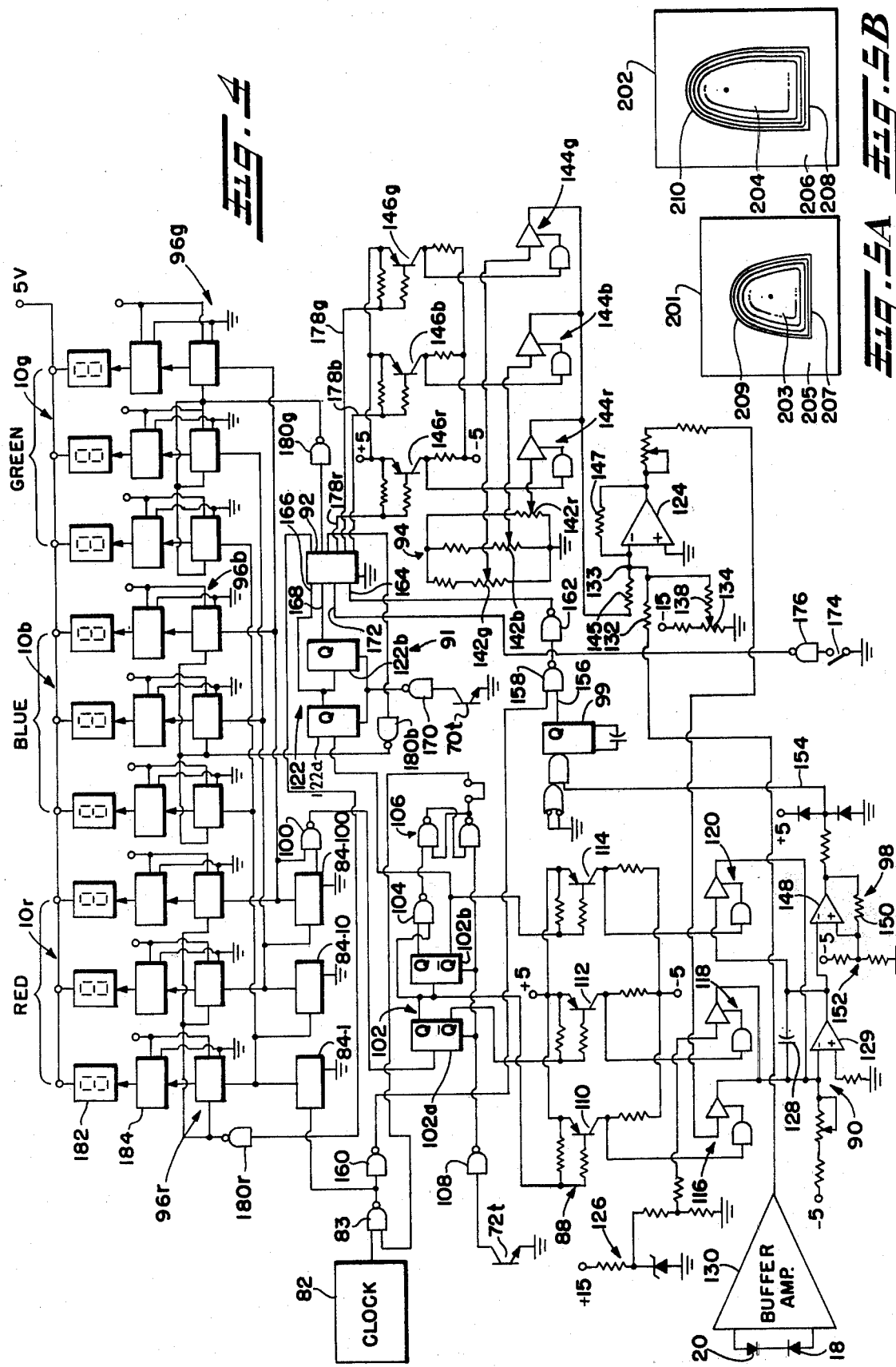

METHOD OF USING A PARTICULAR TRISTIMULUS COLORIMETER IN MAKING ARTIFICIAL TEETH

This is a division of application Ser. No. 499,479, filed Aug. 22, 1974, now U.S. Pat. No. 3,986,777.

BACKGROUND OF THE INVENTION

This invention relates to a colorimeter for measuring the color of a test sample such as teeth or the like, and more particularly relates to a colorimeter having a digital display with continuous update for indicating the color density values of the test sample. Morover, this invention is directed to a method of predetermining the color of a mixture of two porcelains for use in automating restorative dentistry, leading also to a new method for fabricating an artificial tooth, cap, filling or the like.

The steps or procedures usually followed in conventional restorative dentistry are quite subjective and usually include visual comparisons by the dentist and laboratory technician between a reference tooth, such as the tooth to be replaced, capped or filled and/or those adjacent the same, sample artificial teeth on a shade guide, and constructed artificial teeth, caps or fillings. Such conventional color matching techniques are relatively inaccurate and often lead to improper matching between the restoration and the surrounding teeth, for example, due to the subjectivity in the selection procesess and errors therein and to the nonuniformity of shade guides. Moreover, a dentist may draw a map representing colors of different portions of a tooth to be replaced with reference to the shades of several sample teeth on the shade guide, and the subjectivity involved in selecting a matching color for each portion further compounds the inaccuracies of the conventional restoration process.

One prior art device intended to facilitate visual comparison of tooth color with respective colors on a color shade guide is disclosed in U.S. Pat. No. 3,436,157. Although such patented device may increase the accuracy of the visual comparisons made in restorative dentistry, the resultant determinations are still subject to the visual perceptions of the operator.

The conventional method for manufacturing artificial teeth in accordance with given color and opacity data taken from a shade guide comprises the steps of hand sculpting the tooth from certain selected porcelains of respective colors and opacity, and then firing the tooth in a furnace. Such method is subject to the inaccuracies both in the selection of appropriately colored porcelains with which to build the tooth, such selection usually being trial and error approximations, and in the visual perceptions in comparing the constructed artificial tooth restoration relative to the data of the selected color or colors of the shade guide.

SUMMARY OF THE INVENTION

The colorimeter of the instant invention enables dentists and technicians to measure the color of natural teeth and restorations, such as artificial teeth, caps or fillings, in a quantitative manner to increase the accuracy of color and opacity matching therebetween. Moreover, the invention also comprehends a method of using the quantitative data representative of a reference tooth, such as the tooth being replaced, capped or filled or the teeth surrounding the same, for constructing a restoration of comparable color and opacity characteristics.

More specifically, the colorimeter of the instant invention selectively measures the red, blue and green components of nonspecularly reflected light from a test sample, which will be referred to hereafter as a tooth although other samples such as paint, fabric or the like may also be tested, and displays in digital form the measured quantities as respective optical density values to characterize the actual color of the tooth. The colorimeter primarily includes a light source, a fiber optic probe, a color filter wheel, a photosensitive diode, and a digital voltmeter with a display for each of the three color readings. Preferably, the digital voltmeter constitutes a modified dual slope integrator synchronized to the rotation of the color filter wheel so as to provide the respective displays with constantly updated information upon each wheel rotation.

Furthermore, it has been found that lightly colored porcelains obey Beer's Law, which states that the amount of light absorbed by color matter is proportional to the concentration of the color matter. The invention includes two methods of predetermining or predicting the color of a mixture of known differently colored constituent porcelains as an aid in the construction of restorations having color characteristics closely matching those of the reference tooth. In one method an average of the red, blue and green optical density values for each constituent porcelain is used to determine the optical density values of a mixture thereof. In the other more exacting method the respective color optical density values of the constituent porcelains are converted to percent reflected light units using the formula that percent reflected light is directly proportional to the inverse of the antilogarithm of the optical density value, and the respective percents are averaged. Of course, working in reverse when knowing the respective color density or percent color values for the reference tooth and one of the constituent porcelains, a second, and, if necessary third or more, constituent porcelain accurately may be selected for mixing to compose a properly colored matched restoration.

With the foregoing in mind, a primary object of the invention is to measure with reliability the color of a test sample, such as a tooth or the like, and, more particularly, to effect such measurement automatically and with regard to the reflectance of red, blue and green light from such sample.

Another object of the invention is to provide a digital output for a colorimeter, and, especially, to provide the same with a continuous up-dating of the displays indicating measured data for plural colors.

An additional object of the invention is to measure accurately the color of a test sample having a relatively clear glossy coating without interference by ambient light conditions.

A further object of the invention is to be able to map a tooth with regard to the color of various portions thereof, and, more particularly, to provide a scanning colorimeter for effecting the same.

Still another object of the invention is to increase the accuracy in measuring reflectance of test samples, such as teeth or the like.

Still an additional object of the invention is to predict or to predetermine the color of a combination of two differently colored porcelains combined in a mixture or in superposed layers.

Still a further object of the invention is to facilitate the fabrication of dental restorations, such as artificial teeth, caps, fillings or the like, with accurate matching thereof to a reference tooth or the like.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a schematic illustration of the colorimeter of the invention;

FIG. 2 is a plan view of the color filter wheel used in the colorimeter;

FIG. 3 is a block diatram of the measuring circuitry of the invention;

FIG. 4 is a more detailed schematic circuit diagram of the measuring circuitry of the invention; and FIGS. 5A and 5B are plan views of molds used in the fabrication of artificial teeth.

DESCRIPTION OF THE PREFERRED EMBODIMENT

Referring now more particularly to the drawings, wherein like reference numerals refer to like elements in the several figures, the colorimeter of the invention is generally indicated at 2 in FIG. 1. The colorimeter includes an optics portion 4 and an electronics portion 6, the latter including measuring circuitry 8 and a digital display 10 for indicating in optical density units the red, blue, and green color components of a test sample, such as a tooth or the like as mentioned above.

The optics portion 4 comprises a light source generally indicated at 12, a test probe 13 including relatively flexible bifurcated light pipe 14 and a probe tip 15, a color filter wheel 16, and a measuring photosensitive diode 18, the latter being preferably located on a common heat sink or on a component oven and coupled in reverse-poled series connection with a temperature compensating diode 20 to provide a measured signal to the measuring circuitry 8. A synchronizing arrangement 22 provides for synchronization between the measuring circuitry 8 and the rotating color filter wheel 16.

The light source 12 includes a lamp 24, for example, of the tungsten-halogen type, which is energized by a regulated power supply 26 to transmit light through a conventional heat absorbing or infrared filter 28. Such a light source 12 produces a satisfactory uniform distribution of light over the visible spectrum.

The light pipe 14 of the test probe 13, for example, is a bifurcated fiber optic bundle 14, either of the random or segregated type, which has a light input leg 32 to receive light from the source 12 and a light output leg 34 to direct light reflected from the tooth through the respective filters of the color filter wheel 16 interposed in the light path 35 between such output leg and the measuring photosensitive diode 18. Since it is desirable to illuminate the tooth with substantially diffuse incident light, to eliminate the effects of ambient light on the color measurements, and to collect substantially all of the light reflected by the tooth, the probe tip 15 attached to the end 38 of the fiber optic bundle 14 preferably includes a clad rod 39, which is an article manufactured by the American Optical Company in the form of a glass rod 40, which may be of light diffusing material, surrounded by a thin coating of material 41 having an index of refraction different from that of the glass rod, which makes the outer surface of the latter reflective. The clad glass rod diffuses light from the fiber optic bundle 14 providing the same at the output end 44 thereof for impingement on the tooth. Moreover, the clad glass rod 40 collects the light reflected by the tooth for direction back through the fiber optic bundle 14 to the output leg 34.

Referring particularly to the probe tip 15, the glass rod 40 and fiber optic bundle 14 are secured in abutment within a housing 45 from which a stepped enclosure member 46 extends forwardly substantially surrounding the major extent of the glass rod substantially isolating the same from ambient light. Within the enclosure member is located a spring 47 externally concentric with the glass rod and normally in abutment with the forwardmost surface 48 of the housing to urge an also concentric washer 49 away from the surface 48. Moreover, a collar 50 concentric about the glass rod extends forwardly of the end 44 of the latter under the urging of the spring 47 and is retained relative to the enclosure member 46 by respective cooperating flanges 51, 52. The collar 50 is preferably formed of opaque material with a reflective interior surface 53 and the collar 50, glass rod 40, housing 45 and member 46 are preferably of cylindrical configuration for convenience of manipulation and of manufacture. Therefore, when the probe tip 15 is urged with slight pressure into engagement with a tooth, the collar 50 compresses the spring 47 and moves inwardly of the enclosure member 46 as the glass rod end 44 abuts the tooth. The collar 50 blocks ambient light from the measured portion of the tooth and also helps to gather light reflected therefrom and to direct the same into the glass rod 40.

Moreover, as described in U.S. patent application Serial No. 449,491, filed concurrently herewith and assigned to a common assignee, for "Interface for Light Probe", now U.S. Pat. No. 3,947, issued Mar. 30, 1976, it has been found that the addition of a quantity of glycerine 54 or other similar clear material having a relatively high index of refraction, relatively good light transmitting characteristics, and relatively viscous properties may be applied to the end 44 of the glass rod 40 to provide a good interface between the latter and the tooth to avoid specular reflection from the outer clear glaze or coating on the tooth, whereby the majority of reflected light is from the colored portion of the tooth increasing the accuracy of the color measurements. If desired, the collar 50 itself may serve as a receptacle for containment of such quantity of glycerine or the like material. The glycerine may be eliminated if a non-glossy sample is measured or if specularly reflected light can be tolerated.

The light reflected by the tooth transmitted back through the fiber optic bundle 30 to the end 56 of the output leg 34 is at least substantially collimated by a lens 58 and directed along the light path 35. The collimated light in the light path 35 has a relatively large generally circular cross-section 62, illustrated in FIG. 2, for maximum sensitivity and absorption by the respective filters in the color filter wheel, and the light transmitted through the color filter wheel is focused by a futher lens 64 onto the measuring photosensitive diode 18, the voltage drop across which is dependent on the intensity of the light impinging thereon.

The color filter wheel may be, for example, comprised of three conventional red, blue and green acetate filters 66r, 66b, 66g, respectively, and a motor 68 energized from a source not shown rotates the color filter wheel 16, for example, at a speed of approximately 5 revolutions per second, although other speeds also may be used as desired. The synchronizing arrangement 22 comprises two opto-isolator sets, each comprising a respective light emitting diode 70d, 72d, and a respective photosensitive transistor 70t, 72 t. The light emitting diodes 70d, 72d are positioned on one side of the color filter wheel 16 to direct light through respective rotation synchronizing and filter alignment synchronizing light transmissive openings 74 and 76r, 76b, 76g in an opaque annular ring portion 78 proximate the outer circumference of the color filter wheel for periodically energizing the respective photosensitive transistors 70t, 72t as the wheel rotates. In an alternative arrangement the opto-isolator sets may be positioned relative to a separate opaque disc attached to the color filter wheel drive shaft and having appropriate light transmissive openings in the same relative angular positions as the described openings 74, 76 for achieving synchronization as described.

Since the photosensitive diode 18 is extremely sensitive to variations in temperature and may vary its output as much as 2 mv. per degree centigrade, the compensating diode 20, which has similar temperature dependent properties, is connected in reverse-poled series relation to the measuring phtosensitive diode 18. Moreover, if desired, the compensating diode 20 may also be photosensitive and substantially constant intensity light from the lamp 24 transmitted through a further light pipe 80, for example, in the form of a fiber optic bundle, may be used to bias such compensating diode. Thus, the voltage drop across the compensating diode 20, whether or not photosensitive, will remain substantially constant with the exception of variations due to changes in temperature; and due to the reverse-poled connection of the two diodes 18, 20, temperature related voltage variations are equal and opposite so as to cancel the effct thereof.

In operation of the optics portion 4 of the colorimeter 2 the forward-most edge of the collar 50 is touched to the surface of a tooth and slight pressure on the test probe 13 urges the end 44 of the glass rod 40 toward engagement with the tooth surface separated only by the layer of glycerine 54 therebetween. Light from the source 12 transmitted through the fiber optic bundle 30 is diffused in the glass rod 40 and impinges on the portion of the tooth being measured, while the collar 50 blocks ambient light from that portion. Reflected light from the tooth is collected by the reflective interior surface of the collar 50 and the glass rod 40 and such reflected light travels back through the fiber optic bundle to exit the output leg 34 from which it is collimated by the lens 58.

Each of the color filters 66r, 66b, 66g is sequentially imposed in the light path 35 to absorb respective spectral portions of the light impinging thereon, transmitting the remaining light to the lens 64 which focuses the same on the measuring photosensitive diode 18. Moreover, in the synchronizing arrangement 22 each time the color filter wheel begins a rotational cycle the rotation synchronizing opening 74 is aligned to transmit light from the light emitting diode 70d to the photosensitive transistor 70t to indicate the same to the measuring circuitry 8. Also, when the red color filter 66r is fully in the light path 35, as seen at 62 in FIG. 2, the filter alignment synchronizing opening 76r is aligned to transmit light from the light emitting diode 72d to the photosensitive transistor 72t, which tells the measuring circuitry 8 to commence measurement of the red color component of the tooth. The measuring circuitry 8 effects such measurement and causes the same to be indicated in the red display 10; thereafter, when the blue filter alignment synchronizing opening 76b is aligned to transmit light from the light emitting diode 72d to the photosensitive transistor 72t, the latter transmits a further signal to the measuring circuitry 8 to commence measurement and display of the blue color component. Similar operation occurs for the green color component after which the color filter wheel 16 begins its next revolution indicated to the measuring circuitry 8 by the photosensitive transistor 70t.

Turning now more particularly to FIG. 3, the electronic portion 6 of the colorimeter 2 includes the measuring circuitry 8 and respective digital displays 10r, 10b, 10g, preferably in the form of conventional light emitting diode displays, for indicating in optical density units the red, blue and green components of the tooth being measured. The measuring circuit 8, for example, in the form of a modified dual slope integrator, includes a conventional clock signal generator 82 producing an AC output signal at, for example, approximately 100 KHz, which signal is provided via a NAND gate 83 as an input to a conventional three stage decade counter 84. The decade counter has an output coupled to a function control counter 86 which is periodically reset for synchronization with the rotating color wheel 16 by signals from the photosensitive transistor 72t. The purpose of the function control counter 86 is to control switches in the function control 88 to integrate sequentially in an integrator 90, first, the measured voltage from the measuring photosensitive diode 18 and, second, a reference voltage and then to reset the integrator for further similar integrations as each of the color filters 66r, 66b, 66g is positioned in the light path 35. Moreover, the function control by its connection to the NAND gate 83 blocks the clock signal from the decade counter each time the integrator 90 is reset. The function control counter 86 also drives a step counter 91, which is periodically reset on each revolution of the color filter wheel 16 by a signal from the photosensitive transistor 70t, and the step counter drives a decoder 92 that determines which of the red, blue or green calibration circuits 94, which may include calibration and/or zeroing potentiometers, is coupled to the function control 88 and which of the conventional storage latches 96r, 96b, 96g is to be opened to update the signal stored therein for use to drive the respective digital displays.

The integrator 90 normally integrates the measured voltage which is derived from the measuring photo diode 18 compensated by the compensating diode 20 and which is modified by the appropriate calibration circuit 94, until the decade counter 84 reaches a predetermined count; at that point the latter drives the function control counter 86 to operate the function control 88 for effecting integration of the reference voltage, which is of opposite polarity to the measured voltage. When the latter integration dissipates the voltage from the former integration the voltage output from the integrator equals or passes zero or ground potential, and a comparator 98 then emits a pulse signal to trigger a one-shot multivibrator 99 into sending a brief latch opening signal via the decoder 92 to the appropriate storage latch 96r, 96b, 96g causing the same to enter and to hold the count then on the decade counter 84.

Various operating potentials required to drive the elements of the measuring and display circuitry are indicated in some instances in FIG. 4 as being applied at selected points in the circuitry and all such potentials are received from a conventional power supply not shown.

Referring now more particularly to the schematic circuit diagram of FIG. 4, the clock 82 is coupled via the NAND gate 83 to drive the three integrated circuit stages of the conventional decade counter 84, and two outputs from the last stage thereof are coupled via a further NAND gate 100 that drives a J-K flip-flop 102 in the function control counter 86. The J-K flip-flop 102 has two stages 102a, 102b, and the two Q outputs therefrom are coupled via a NAND gate 104 to drive a latch circuit 106 that stops the clock signal from passing the NAND gate 83 when the flip-flop has reached a predetermined count. Moreover, the filter alignment sychronizing photosensitive transistor 72t connected between ground potential and the input to an inverting NAND gate 108 controls the latter to produce a high or logic 1 output pulse when the former is energized by a light pulse to reset the flip-flop 102 to a zero count and to open the latch circuit 106 permitting the clock signal to pass the NAND gate 83.

The Q, and Q outputs from the first flip-flop stage 102a and the Q output from the second flip-flop stage 102b are connected, respectively, to the base inputs of switching transistors 110, 112, 114 in the function control 88, and the collector of each such transistor is connected to drive respective conventional analog switches generally indicated at 116, 118, 120. Moreover, the Q output of the second flip-flop stage 102b is also connected to the driving input of a J-K flip-flop 122 having stages 122a, 122b which constitute the stepping counter 91. The analog switch 116 is connected to the output of a summing amplifier 124 at which is provided the compensated and calibrated measured voltage, and the analog switch 118 is connected to a conventional zener diode reference voltage generator 126. The analog switch 120 is connected across the integrating capacitor 128 in the feedback circuit of operational amplifier 129 of the integrator 90 to discharge the same when energized by the transistor 114.

The compensated voltage from the measuring and compensating photo diodes 18, 20 is amplified in a conventional buffer amplifier 130, the output from which is connected via resistor 132 to the summing input 133 of the summing amplifier 124. Moreover, a master calibrating potentiometer 134 is connected via a resistor 138 to the summing input 133. The calibration circuit 94 includes three respective potentiometer circuits 142r, 142b, 142g connected to respective conventional analog switches 144r, 144b, 144g, each of which has a respective energizing input from the collector of a transistor 146r, 146b, 146g. Thus, depending on which of the transistors and analog switches in the calibration circuits 94 is energized by the decoder 92, a respective one of the red, blue and green calibration potentiometer circuits will be connected to provide a signal via the resistor 145 to the summing input 133 of the summing amplifier 124. Alsp, if desired, the feedback resistor 147 of the summing amplifier 124 may be a variable resistor to vary the gain of such operational amplifier or a plurality of interchangeable resistors or potentiometers may be substituted therefor for selective circuit insertion by still further analog switches, not shown, to provide for varying the amplifier gain for each of the red, blue and green colors measured.

The comparator 98 includes a conventional operational amplifier 148 with a large resistor 150 connected between the output and the positive input thereof and a bias potential circuit 152 connected to the positive input. The negative input to the operational amplifier 148 is taken from the output of the operational amplifier 129 in the integrator 90, and the output from the operational amplifier 148 is connected via a line 154 to the input of the conventional one-shot multivibrator 99. The comparator 98 produces an output signal on the line 154 when the integrator output goes to or passes through zero or ground potential, which signal triggers the one-shot multivibrator to generate at its output 156 a latch opening signal. The latter signal is synchronized in the NAND gate 158 with the clock signal from inverting NAND gate 160, and the synchronized latch opening signal is inverted in an inverting NAND gate 162 and applied to a first input 164 of the decoder 92.

The decoder 92 receives second and third inputs 166, 168 from the Q outputs of the two stages in the step counter J-K flip-flop 122, which is periodically reset to a zero count each time the rotation synchronizing photosensitive transistor 70t is energized and provides a pulse thereto via an inverting NAND gate 170. A fourth input 172 to the decoder 92 is provided from a finger control switch 174 and inverting NAND gate 176, which will be described in more detail below. The decoder 92, for example, comprises an integrated circuit including a plurality of logic gates that convert the binary signals on the second and third inputs 166, 168 to three distinct output possibilities presenting the same on the respective outputs thereof. For example, logic one and zero signals on the respective second and third inputs 166 and 168 operate the decoder 92 to provide on the output 178r a signal that turns on transisor 146r to close the analog switch 144r placing the calibration potentiometer circuit 142r in the summing input circuit of the summing amplifier 124. Similarly, logic zero and one and logic one and one signals, respectively, on the decoder second and third inputs 166, 168 will effect development on the outputs 178b, 178g output signals to energize the respective transistors 146b, 146g to close analog switches 144b, 144g placing respective calibrating potentiometer circuits 142b, 142g in the summing input circuit of the summing amplifier 124. Moreover, the respective one, zero; zero, one; and one, one logic signals at the second and third inputs 166, 168 of the decoder 92 will also condition circuits therein to pass the latch opening signal upon occurrence thereof at the first input 164 to the respective inverting NAND gates 180r, 180b, 180g for application to the respective storage latch circuits 96r, 96b, 96g.

Each of the storage latch circuits 96 preferably comprises three respective conventional integrated circuits which are coupled to respective stages of the decade counter 84, and upon receipt of a latch opening signal from a respective inverting NAND gate 180, a latch will open to receive the instantaneous count on the respective decade counter stage and will close immediately thereafter due to the signal from the clock 82 through the inverting NAND gate 160 to an input of the NAND gate 158. Such count signal then remains stored in the respective latch while the decade counter continues to count. Each of the displays 10r, 10b, 10g includes three conventional light emitting diode indicators 182 driven by three respective conventional integrated circuit decoder drivers 184, the latter being coupled to convert signals from the latches 96 to driving signals for the respective light emitting diodes.

Operation of the circuitry 8 commences when the light transmissive opening 74, which precedes the light transmissive opening 76r in the color filter wheel, passes light from the light emitting diode 70d to the rotation synchronizing photosensitive transistor 70t to reset the J-K flip-flop 122 such that the Q outputs of the first and second stages 122a, 122b are at logic zero. As the color filter wheel 16 rotates slightly further the light transmissive opening 76r passes light from the light emitting diode 76d to the filter alignment synchronizing photosensitive transistor 72t which resets the two stages 102a, 102b, of the J-K flip-flop 102 such that the Q and Q outputs thereof are respectively at logic zero and logic one and opens the NAND gate 83 to pass the clock signal to the decade counter 84. Moreover, the logic zero signal at the second input 166 of the decoder 92 is causing the transistor 146r and analog switch 144r to insert the calibration potentiometer circuit 142r in connection with the summing amplifier 124; and the logic zero at the Q output of the first J-K flip-flop stage 102a turns on the transistor 110 to close the analog switch 116 passing the compensated and calibrated measured signal at the output of the summing amplifier 124 to the integrator 90.

After the decade counter 84 has reached a predetermined count of say 900 and NAND gate 100 drives the first flip-flop stage 102a such that the Q output goes to logic one and the Q output goes to logic zero, whereby the analog switch 116 opens, analog switch 118 opens and the integrator 90 begins integrating the reference voltage from the reference voltage generator 126; and since the latter voltage is of a different plarity than the former voltage and of a magnitude usually greater than the former voltage, at some point during such reference integration the output from the integrator 90 will cross zero potential. During the reference integration the decade counter continues counting again from 900 through zero, and when the output from the integrator 90 crosses zero a pulse generated by the comparator 98 triggers the one-shot multivibrator to generate the latch opening signal routed by the decoder 92 to the inverting NAND gate 180r to open briefly the storage latches 96r in the manner described above.

As the counter 84 continues its count and reaches the mentioned predetermined count of 900, the NAND gate 100 produces a further output signal to advance the J-K flip-flop 102 to the next count which effects opening of the analog switch 118 and closing of the analog switch 120 to discharge the capacitor 128 in the integrator 90 resetting the same. Moreover, when the Q output of flip-flop stage 102b goes from logic one to logic zero, that transition effects stepping of the flip-flop 122 to its next count, driving the first stage 122a Q output to logic one. When the decade counter 84 for the third time reaches its predetermined count, the signal from the NAND gate 100 advances the J-K flip-flop 102 to its next count such that both its Q outputs are at logic one driving the output of the NAND gate 104 to logic zero to control the latch 106 to open the NAND gate 83 blocking the clock signal from the decade counter 84 while the analog switch 120 remains closed to assure complete discharge of the capacitor 128.

When the color filter wheel 16 has rotated sufficiently to align the light transmissive opening 76b to pass light to the filter alignment synchronizing photosensitive transistor 72t, the latter resets the J-K flip-flop 102 which operates the latch 106 to close the NAND gate 83 again passing the clock signal to the decade counter 84 for repetition of the above described operation to measure the light transmitted through the blue filter of the color filter wheel 16. During such measurement the decoder 92 causes the blue calibrating potentiometer circuit 142b to be connected to the summing input of the summing amplifier 124 and also provides for passage of the blue latch opening signal via the inverting NAND gate 180b to the blue storage latch circuits 96b. Moreover, similar operation of the circuitry occurs upon the input of a light signal through the light transmissive opening 76g to the photosensitive transistor 72t for measurement of the light transmitted through the green filter in the color filter wheel 16, the step counter 91 and decoder 92 then having inserted the green calibrating potentiometer circuit 142g in connection with the summing amplifier 124 and being conditioned to pass the received latch opening signal to the green storage latch circuits 96g.

Thus, the time at which the respective latch circuits 96r, 96b, 96g are opened and the count then on the decade counter 84 depends on the time required for the integrator 90 during its integration of the reference voltage to disspiate the stored signal from the integration of the measured voltage, and it should be understood that such count when each latch is opened is proportional to the quantity of light then impinging on the measuring photosensitive diode 18. The decoder drivers 184 include respective logic circuits responsive to the signals stored in the respective storage latches to drive various light emitting diodes in the display indicators 182 to provide digital read outs in optical density units of the red, blue and green components of the measured light.

Moreover, calibration of the circuitry 8 is effected by touching the colorimeter probe 36 to a sample having known color values, adjusting the master calibration potentiometer 134 to approximately center range and finally adjusting the respective calibrating potentiometer circuits 142r, 142b, 142g to provide indications at the respective displays 10 that corresponds to the known color value of the standard. Thereafter the individual calibrating potentiometer circuits will usually satisfactorily track whenever the master calibrating potentiometer 134 may require adjustment.

The signals stored in the latches 96 and displayed in the displays 10 are normally updated periodically at a rate determined by the speed of rotation of the color filter wheel 16. However, if desired, in order to facilitate mapping a tooth or other sample in terms of the colors at various points or portions thereof, the finger control switch 174 and NAND gate 176 may be coupled to a fourth input 172 of the decoder 92 to block passage of respective latch opening signals to the latches 96 unless the finger control switch 174, preferably located as shown on the probe tip 15, is closed by the operator. Thus, the operator would align the colorimeter probe 13 to a portion of the tooth and would then close the finger control switch 174 allowing respective latch opening signals to pass to the storage latches 96 as described above to operate the respective displays 10. Before removing the probe from that tooth portion, the finger control switch 174 may be released to retain the instant signals in the storage latches, and the operator can then record the displayed information. Thereafter, the same procedure may be repeated for other selected portions of the tooth.

A natural tooth usually comprises gingival and incisal portions, and, as will be described below, an artificial tooth may be constructed in two layers, i.e. gingival and incisal layers, with one being superposed on the other in a molding process. In FIGS. 5A and 5B an incisal mold 201 and a gingival mold 202 are illustrated for use in molding an artificial tooth in such a two-step process. The molds 201, 202 are similar, and each includes a concave portion 203, 204 surrounded by a relatively flat apron 205, 206. The concave portions have respective desired depths and may be tapered or rounded, depending on the configuration of the tooth being replaced, the concave portion 204 of the gingival mold actually conforming as much as possible to the dimensions of a tooth being replaced. The dimensions of the incisal mold concave portion 203 depend on the color characteristics of the reference tooth, as will become more apparent below. Moreover, each concave portion has a base line portion 207, 208 representing the cutting edge of the artificial tooth and a curved line portion 209, 210, which in the former represents the maximum extent of the incisal tooth layer and in the latter represents the maximum tooth dimension to and including the root portion thereof.

Each of the molds 201, 202 is preferably of a resilient material, such as silicone, to permit deformation facilitating removal of a tooth part formed therein. In using the molds 201, 202 to fabricate an artificial tooth, a quantity of a first porcelain of a first color, the incisal porecelain, is mixed with water to form a slurry or paste which is placed in the first mold 201. Thereafter, such material is blotted within the mold to remove as much water as possible, thus forming a reasonably solid tooth incisal layer. Such formed incisal layer is then placed in the bottom of the mold 202 with the cutting edge portion thereof in abutment with the base line portion 208, and a quantity of a second porcelain of a second color, the gingival porcelain, is mixed with water to form a paste and placed in the mold 202 to fill the same. The blotting procedure is repeated, and after the porcelain in the mold 202 is reasonably dry and solid, it is removed as a single tooth and fired in a conventional furnace to solidify the artificial tooth for replacement in the patient's mouth. If desired, after the firing procedure, the tooth may be coated with a clear gloss-producing material and refired in the furnace to provide a cleas glossy coating to the tooth. If necessary, additional manual carving or shaping procedures may be taken.

The color of a tooth may be characterized both by the red, glue and green optical density values of the gingival and incisal portions thereof and by the gradient of blending of the tooth colors between such tooth portions. Moreover, by selecting the gingival and incisal porcelains to be used in the above-described molding method so that the red, blue and green optical density values for the combination of such porcelains approximate those measured values of the reference tooth portions, a good color match between a fabricated tooth and the reference tooth can be made. More particularly, it has been found that for two such layered gingival and incisal porcelains, for example, of equal respective thicknesses, the respective red, blue and green optical density values of each may be averaged to predict to or determine the red, blue and green optical density values of the combination.

A method for selecting the porcelains for use in fabricating an artificial tooth that matches the color characteristics of a reference tooth includes the steps of measuring the red, blue and green optical density values for the gingival and incisal portions of the reference tooth; selecting a gingival porcelain having red, blue and green optical density values approximately equal to those measured at the gingival portion of the reference tooth; determining respective red, blue and green optical density values that when averaged with respective values measured for the gingival tooth portion will equal the respective values measured at the incisal tooth portion; and selecting an incisal porcelain having such determined red, blue and green optical density values. Thereafter, the incisal porcelain may be molded in the first mold 201 and then placed in the gingival mold 202. The gingival porcelain is then placed in the mold 202 to fill the same and the remaining steps are performed to complete the fabrication of an artificial tooth as described above. By using the described method to determine the gingival and incisal porcelains with which to mold an artificial tooth, it has been found that the above-described optical density value averaging method provides a good color match between the reference and artificial teeth. Moreover, using an incisal mold 201 that tapers to zero depth from the maximum depth at the base line 203 to the curved portion 205 and a generally constant depth gingival mold 202, for example, the gradient or degree of color blending between the gingival and incisal porcelains may be satisfactory; however, if desired, the thicknesses may be slightly varied to vary the color gradient. Furthermore, the red, blue and green optical density values of portions of the reference tooth between the gingival and incisal portions also may be measured, and the amount of such tapering in the incisal mold 201 may be made substantially proportional to the color gradient between such incisal and gingival portion.

In the above-described method, it has been found that the respective optical density values of the red, blue and green colors for a particular thickness of incisal porcelain, for example approximately 1 mm thick, superposed on a gingival porcelain layer the two different constituent porcelains forming an artificial tooth will combine as relatively linear averages indicative of the color of such tooth. Moreover, as the thickness of one porcelain, usually the incisal, varies with respect to the other, weighting factors directly proportional to such thickness may be used to determine or to predict the apparent color of the molded two layers of porcelain or portions thereof. A more detailed example follows in which were used an incisal mold 201 having a 9 mm base line dimension, a 9 mm base line to top of curved line portion dimension, a 1 mm maximum depth at approximately the geometric center of concave portion 203 tapering to zero depth at the top of the curved line portion and substantially constant in depth to the base line portion; and a gingival mold 202 having a 9 mm base line and 15 mm base line to top of curved line portion dimensions and a substantially constant depth of approximately 2 mm curving gradually to the apron 206.

EXAMPLE 1

Using the above-described colorimeter, the gingival and incisal portions of a reference tooth were measured, and the measured red, blue and green optical density values were 0.26, 0.59, 0.40 for the former, and 0.46, 0.62, 0.54 for the latter. A gingival porcelain was selected having color optical density values approximately equal to the measured color optical density values of the reference tooth gingival portion, such selected gingival porcelain being of the New Hue color type manufactured by Sterndent Corporation of Mt. Vernon, New York, and actually having red, blue and green optical density values of 0.29, 0.61, 0.46. Since the incisal portion of the reference tooth had a red optical density value of 0.46, by doubling that number and subtracting the red optical density value 0.26 of the measured gingival portion of the reference tooth, it was determined that the incisal porcelain should have a red optical density value of 0.66. Similar calculations were made to determine the blue and green optical density values of the incisal porcelain, and an incisal porcelain, as above, was then selected having such red, blue and green optical density values, which in the instant example was 0.70, 0.66, 0.68, respectively. Thereafter, the incisal layer of the artificial tooth was formed in the mold 201 using the determined incisal porcelain in slurry form, which was blotted as in the method described above; and the substantially solidified incisal layer was placed in the gingival mold 202, which was then filled with the gingival porcelain in slurry form and blotted. The substantially solid tooth was then fired in a furnace in conventional manner to produce an artificial tooth, which was of the calculated color where the two layers were of equal thickness and of a color that approached that of the gingival porcelain as the incisal layer thickness tapered to zero.

The foregoing method of color evaluation using averages of the red, blue and green optical density values for two constituent porcelains to determine or to predict the color of a mixture of such porcelains, either by actually mixing the same or by combining the same in layers in the method described above for fabricating artificial teeth, may be used for combining two or more differently colored constituent porcelains or other similar materials with reasonable accuracy as to color matching to a desired color. It has also been found, however that a more elaborate method utilizing percent color values of the constituent porcelains may be used for predicting or predetermining the color of a mixture thereof, and such method is described in detail below.

Each porcelain material used in the fabrication or construction of artificial teeth, caps, fillings or the like usually comprises a base porcelain which is of a neutral color or white, and by the addition of amounts of yellow, cyan and magenta pigment or coloring matter, the effective color of such porcelain may be varied; alternatively red, blue and green pigments may be used. Since most such porcelains are relatively lightly colored, they obey Beer's Law in that the amount of light absorbed by the colored matter in the porcelain is proportional to the concentration of the colored matter therein. Therefore, the amount of colored matter in each porcelain or in a mixture of two or more differently colored pocelains is proportional to the percent reflected light of that color relative to the total reflected light from the sample, which is directly proportional to the inverse of the antilogarithm of the optical density value for that color.

It has been determined that two differently colored constituent porcelains having approximately the same ratio of pigment-to-base or background material will fix linearly with respect to the percent or amount of each color therein; and for porcelains having different pigment-to-background or base ratios appropriate weighting factors may be calculated directly in porportion to such ratios to determine the color mixture of such constituent porcelains.

This method of predicting the color of a mixture of two equal quantities of differently colored constituent porcelains having the same pigment-to-background ratios includes the steps of measuring the red, blue and green optical density values for each constituent porcelain; converting such optical density values to values directly porportional to the percent red, blue and green color for each porcelain; averaging the latter respective red, blue and green percent values; and reconverting such averages to the respective optical density unit values indicative of the color of such mixture. The following Examples 2 and 3 illustrate this method for porcelains having approximately equal pigment-to-background ratios, and Example 4 illustrates this method for two porcelains of different pigment-to-background ratios. It is noted that the measured data presented in the following examples take into consideration a 0.77 calibration factor for the colorimeter which was calibrated against a known standard after such measurements were made.

EXAMPLE 2

Equal quantities of Stern gold bond air fired New Hue color porcelains No. 61 and No. 87, manufactured by Sterndent Corporation, Mt. Vernon, New York, each of which porcelains has approximately equal pigment-to-background ratios, were measured using the above-described colorimeter; and the measured optical density values for the red, blue and green components, after multiplication by the mentioned 0.77 calibration factor, were 0.331, 0.477, 0.385 for the former and 0.385, 0.755, 0.554 for the latter. The inverse for the antilogarithm for each of the mentioned values was determined to be, respectively, 0.467, 0.433, 0.412, and 0.412, 0.176, 0.279. Although not necessary, the actual percent of reflected light for each color of each porcelain may be determined hereby multiplying these latter decimal numbers by 100%.

The average of each of the red, blue and green percents for the two constituent porcelains were, respectively, 0.440, 0.255, 0.345; and by taking the inverse of each of the latter numbers and the logarithm of each quotient, the predetermined or predicted optical density value for each of the red, blue and green color components of the resulting mixture of the two constituent porcelains was 0.462, 0.770, 0.600. To check the accuracy of the described method, the resulting porcelain mixture was measured using the above-described colorimeter, and the measured optical density unit values for the red, blue and green color components thereof was 0.460, 0.820, 0.620, after multiplication by the mentioned calibration factor. The differences between the predicted and measured color values were within the range of experimental error and tolerances for desirable color matching of dental restorations and natural teeth.

EXAMPLE 3

Equal quantities of No. 67 porcelain and No. 87 porcelain of the type manufactured by Sterndent Corporation described above in Example 2 were measured using the above-described colorimeter, and the measured red, blue and green optical density values, after multiplication by the 0.77 calibration factor, were 0.231, 0.524, 0.367 for the former and 0.385, 0.755, 0.554 for the latter. The inverses of the antilogarithm of such optical density values were, respectively, 0.588, 0.299, 0.427 and 0.412, 0.176, 0.279. Although not necessary, the actual percent of reflected light for each color of each porcelain may be determined here by multiplying the latter decimal numbers by 100%.

The averages for the red, blue and green reflectances for the constituent porcelains were, respectively, 0.500, 0.238, 0.353; and the logarithm of the inverse of each of the latter yielded 0.391, 0.809, 0.587, which represented the predicted optical density values for the red, blue and green color components of a mixture of two equal quantities of the two constituent porcelains. To check the accuracy of the predicted values, the porcelain mixture was measured using the above-described colorimeter, and the measured red, blue and green optical density unit values after multiplication by the 0.77 calibration factor were 0.380, 0.800, 0.570. The differences between the predicted and measured color values were within the range of experimental error and tolerance for desirable color matching of dental restorations and natural teeth.

From the foregoing examples, it should be understood that the color of a porcelain mixture of two or more linearly mixing constituent porcelains, i.e. having approximately equivalent pigment-to-background ratios, is determined by the average of the amounts of coloring matter in each of the constituent porcelains. In the following example, a weighting factor is used to determine the predicted color of a mixture of two constituent porcelains having different pigment-to-background ratios.

EXAMPLE 4

Equal quantities of porcelain No. 61 and porcelain No. 66 of the type manufactured by Sterndent Corporation described above in Example 2 were measured using the above-described colorimeter, and the respective red, blue and green optical density values for the two porcelains were 0.331, 0.477, 0.385 and 0.254, 0.477, 0.347, after multiplication by the 0.77 calibration factor. The inverse of the antilogarithm of each of the preceding numbers was 0.467, 0.333, 0.412 and 0.555, 0.333, 0.450. Although not necessary, the actual percent reflected light for each color of each porcelain may be calculated by multiplying the latter decimal numbers by 100%.

It was determined experimentally, as described, below, that the pigment-to-background ratio for the No. 66 porcelain was greater than the pigment-to-background ratio of the No. 61 porcelain by a factor of 0.13. Therefore, in determining the additive average of the red, blue and green reflectances of a combination of the two porcelains, each of the No. 66 porcelain percent reflectance values were first weighted by multiplying the same by 1.13. The averages of the percents reflectance of the No. 61 porcelain and the weighted percents reflectance of the No. 66 porcelain were taken, and the logarithms of the inverses thereof yielded predicted red, blue and green optical density values of 0.340, 0.584, 0.438 for a mixture of the two constituent porcelains. To check the foregoing measurements and calculations, the measured red, blue and green optical density unit values of the porcelain mixture, after multiplication by the 0.77 factor, were 0.330, 0.580, 0.450. The differences between the predicted and measured color values were within the range of experimental error and tolerance for desirable color matching of dental restorations and natural teeth.

The 0.13 difference factor between the two pigment-to-background ratios for the No. 61 and No. 66 porcelains was determined experimentally by measuring the red, blue and green optical density values of a mixture of equal quantities of such porcelains using the above-described colorimeter, multiplying each such value of a 0.77 calibration factor, and taking the inverse of the antilogarithm of each such number. Thereafter, knowing the respective percent reflectance for each of the red, blue and green colors of the porcelain mixture, and knowing the percents reflectance for each individual constituent porcelain, such difference factor can be calculated, for example, by multiplying the mixture red percent reflectance by two, subtracting the porcelain No. 61 red percent reflectance from the product, dividing the difference by the porcelain No. 66, which is known to have the larger ration, red percent reflectance, and subtracting 1 from that quotient. However, porcelains may be manufactured and labeled with such information to faciliate using the above-described method.

It should now be understood that the instant invention provides an improved colorimeter and methods for using the same or similar devices for color matching of porcelains and the like.

The embodiments of the invention in which an exclusive property or privilege is claimed are defined as follows:

1. A method of fabricating an artifical tooth, comprising:
   (1) measuring at the gingival and incisal portions of a reference tooth the respective red, blue and green optical density values thereof, each of said measuring steps including illuminating respective portions of such reference tooth, using a light sensitive means producing electrical output signals respectively proportionally representative of the intensities of plural colors of light received thereby from such an illuminated reference tooth, respectively integrating in one direction first signals represenative of such electrical output signals for each respective color for a timed duration to provide respective integrated signal level outputs and then a reference signal in an opposite direction, and converting the respective times required to integrate such reference signal from such integrated signal level outputs to a predetermined level output into respective red, blue and green optical density values;
   (2) selecting a first porcelain material for the gingival portion of such artifical tooth having optical density values corresponding to the those measured for the gingival portion of such reference tooth;
   (3) determining a second porcelain material for combination with such first porcelain material substantially to match the optical density values corresponding to those measured for the incisal portion of such reference tooth; and
   (4) combining such first and second porcelain materials to form an artifical tooth having optical density values substantially matching those of such reference tooth.

2. A method as set forth in claim 1, said step of determining comprising determining the red, blue and green optical density values for averaging with those of at least one of such first porcelain material and those measured for the gingival portion of such reference tooth to equal those measured at the incisal portion of such reference tooth, and selecting a second porcelain material having approximately such determined red, blue and green optical density values.

3. A method as set forth in claim 2, said step of combining comprising making a paste-like mixture of such second porcelain material and placing the same in a first mold, blotting such paste-like mixture in such mold until substantially solid, removing such solidified porcelain and placing the same in a second larger mold, making a paste-like mixture of such first porcelain material and placing the same to fill such second mold, blotting the material in such second mold until substantially solid, removing such solidified material from such second mold, and firing the same in a furnace.

4. A method as set forth in claim 3, wherein the maximum depth of such first mold is approximately half the maximum depth of such second mold and the shape of such second mold approximates the shape of such reference tooth.

5. A method as set forth in claim 4, comprising measuring the reference tooth at portions between the gingival and incisal portions and making such first mold such that it tapers from the point of maximum depth to a point of minimum depth at a rate proportional to variations in such measurements.

6. A method as set forth in claim 1, wherein said steps of illuminating and producing comprise using a relatively flexible, solid, light conductive means to direct incident light onto such reference tooth and to direct light reflected by such reference tooth to such light sensitive means.

7. A method of fabricating an artifical tooth, comprising:
(1) measuring at the gingival and incisal portions of a reference tooth the respective red, blue and green optical density values thereof, each of said measuring steps including illuminating respective portions of such reference tooth, using a light sensitive means producing electrical output signals respectively proportionally representative of intensities of plural colors of light received thereby from such an illuminated reference tooth, respectively integrating in one direction first signals representative of such electrical output signals for each representative color for a timed duration to provide respective integrated signal level outputs and then a reference signal in an opposite direction, and converting the respective times required to integrate such reference signal from such integrated signal level outputs to a predetermined level output into respective red, blue and green optical density values;

(2) determining from such measured optical density values the red, blue and green percent reflected light values of the gingival and incisal portions of such reference tooth;

(3) selecting a first porcelain material for the gingival portion of such artifical tooth having respective red, blue and green percent reflected light values corresponding to those measured for the gingival portion of such reference tooth;

(4) determining a second porcelain material for combination with such first porcelain material substantially to match the red, blue and green percent reflected light values corresponding to those measured for the incisal portion of such reference tooth; and (5) combining such first and second porcelain materials to form an artificial tooth having red, blue and green percent reflected light values substantially matching those of such reference tooth.

8. A method as set forth in claim 7, wherein said steps of illuminating and producing comprise using a relatively flexible, solid, light conductive means to direct incident light onto such reference tooth and to direct light reflected by such reference tooth to such light sensitive means.

9. A method as set forth in claim 7, said step of determining comprising determining the red, blue and green percent reflected light values for averaging with those of at least one of such first porcelain material and those of the gingival portion of such reference tooth to equal those of the incisal portion of such reference tooth, and selecting a second porcelain material having approximately such determined red, blue and green percent reflected light values.

10. A method as set forth in claim 9, said step of combining comprising making a paste-like mixture of said second porcelain material and placing the same in the first mold, blotting such paste-like material in such mold until substantially solid, removing such solidified porcelain and placing the same in the second larger mold, making a paste-like mixture of such first porcelain and placing the same to fill such second mold, blotting the material in such second mold until substantially solid, removing such solidified material from such second mold, and firing the same in a furnace.

11. A method as set forth in claim 10, wherein the maximum depth of such first mold is approximately half the maximum depth of such second mold and the shape of such second mold approximates the shape of such reference tooth.

12. A method as set forth in claim 11, comprising measuring the reference tooth at portions between the gingival and incisal portions and making such first mold such that it tapers from the point of maximum depth to a point of minimum depth at a rate proportional to variations in percent reflected light determined from such measurements.

* * * * *